United States Patent [19]

Shoemaker

[11] Patent Number: 5,013,891

[45] Date of Patent: May 7, 1991

[54] PERSONAL APPLIANCE HAVING SHOCK PROTECTION CIRCUITRY

[75] Inventor: Richard E. Shoemaker, Milford, Conn.

[73] Assignee: Conair Corporation, Stamford, Conn.

[21] Appl. No.: 69,896

[22] Filed: Jul. 6, 1987

[51] Int. Cl.⁵ .............................................. H02H 3/16
[52] U.S. Cl. .................................... 219/385; 219/383; 361/42; 361/178; 307/326; 34/97
[58] Field of Search .................... 219/363, 364; 361/1, 361/42, 178; 307/118, 140, 326; 34/97-101

[56] References Cited

U.S. PATENT DOCUMENTS

| | | | |
|---|---|---|---|
| 4,270,158 | 5/1981 | Gilardoni et al. | 361/178 |
| 4,464,582 | 8/1984 | Aragaki et al. | 219/363 |
| 4,550,358 | 10/1985 | Crowley et al. | 361/178 |
| 4,683,369 | 7/1987 | Rieckman et al. | 219/364 |
| 4,687,906 | 8/1987 | Fujishima et al. | 219/364 |
| 4,706,153 | 11/1987 | Sainomoto et al. | 361/178 |
| 4,712,154 | 12/1987 | Madsen | 361/178 |

Primary Examiner—M. H. Paschall
Attorney, Agent, or Firm—Haynes N. Johnson

[57] ABSTRACT

A personal appliance, such as hair dryer, with enhanced shock hazard protection, and including a housing formed of two complementary and interfitting sections, electrical units mounted within the housing, a power cord leading to the housing, an IDCI on the power cord, and a sensing wire associated with the power cord leading from said housing to said IDCI, electroconductive coating on the internal surfaces of the housing sections, with the coating being electrically connected to the sensor wire, whereby water contacting the coating and the power cord or any of the electrical units will cause a voltage in the sensing wire and thereby trigger the IDCI.

5 Claims, 2 Drawing Sheets

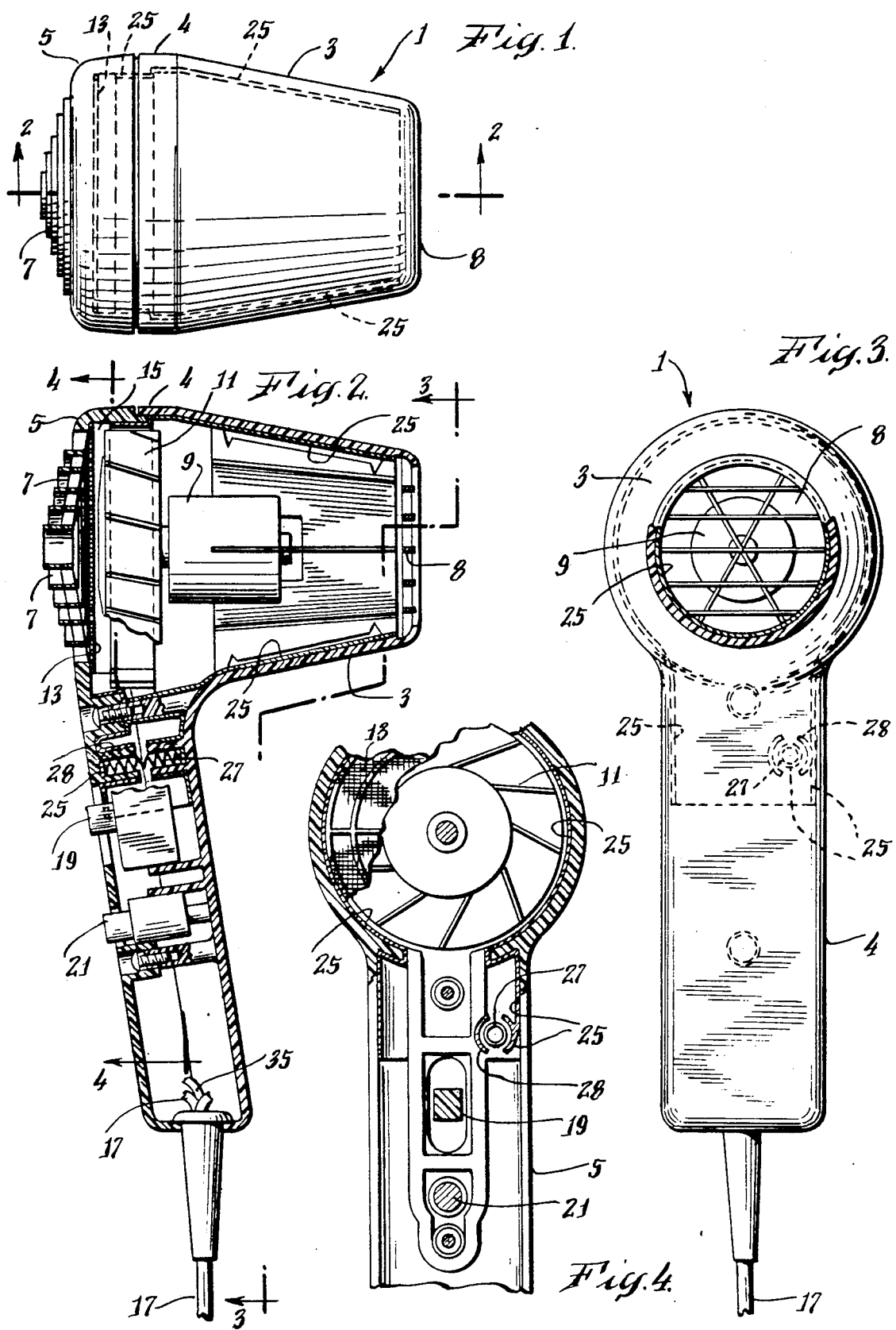

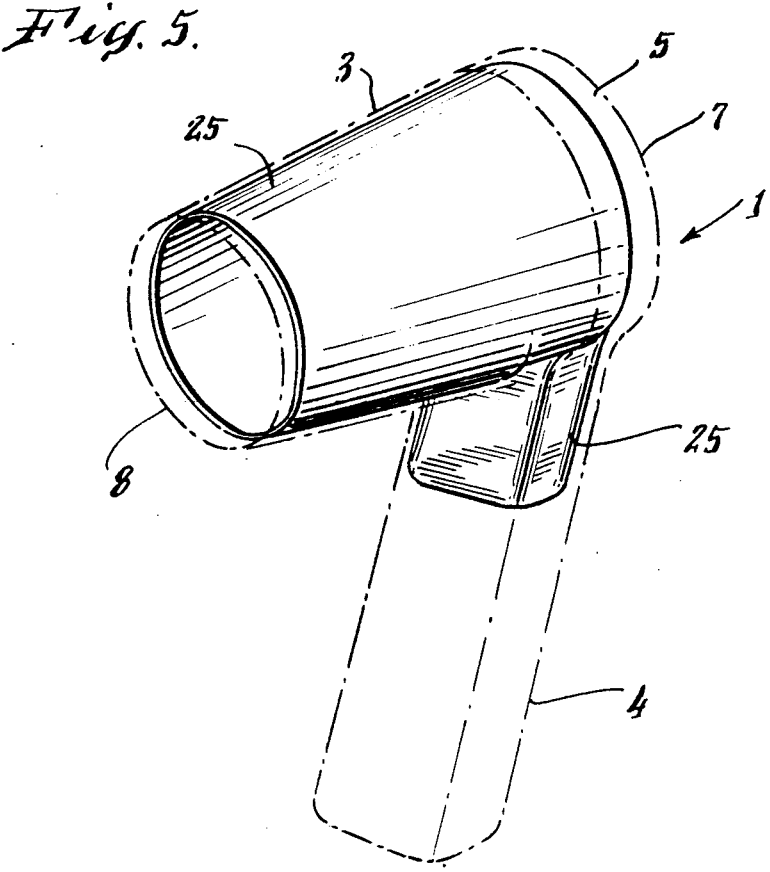
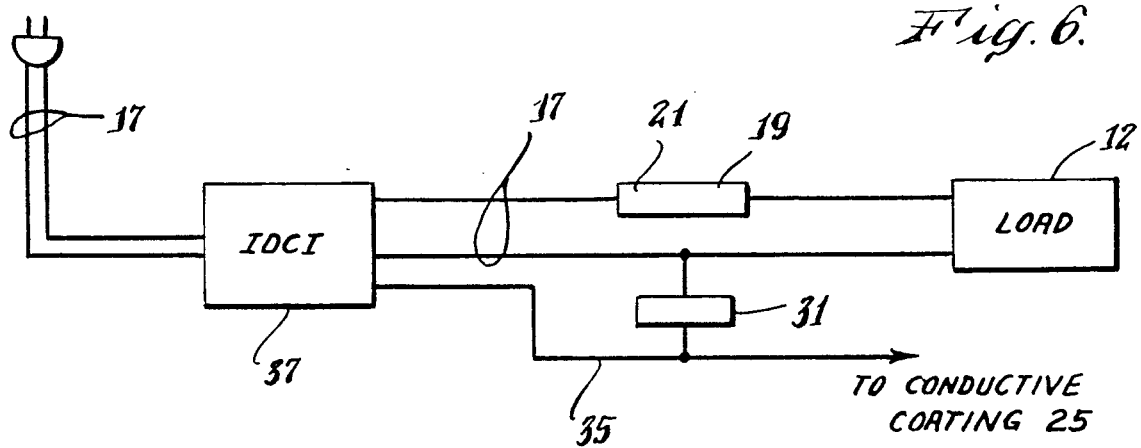

PERSONAL APPLIANCE HAVING SHOCK PROTECTION CIRCUITRY

FIELD OF THE INVENTION

This invention relates to the field of personal appliances, such as hair dryers, and, in particular, to shock protection circuitry for use in such appliances.

A need for shock protection has arisen in the past few years due to a series of accidents which have occurred in the use of personal appliances. These accidents have resulted from situations such as dropping a hair dryer into a filled bathtub or basin, sometimes resulting in electrocution.

Prior types of circuits in this field have included ground-fault circuit interrupters (GFCI's) installed in the home and immersion detection circuit interrupters (IDCI's). The former are part of the protective system now required by the code in new houses; the latter are protective systems associated with the particular personal care appliance.

Examples of IDCI's are found in Gilardoni et al. U.S. Pat. No. 4,270,158 and Aragaki et al. U.S. Pat. No. 4,464,582. These use a third wire connecting sensing means with control circuits which shut off the power upon voltage being applied to the third wire by the sensing means. The difficulty with these structures is that the sensing means is of a type which does not always detect the presence of water and, so, fail to function. For example, Gilardoni uses wire nets which are supposed to be interconnected when wet; and Aragaki uses a series of water-sensing strips.

BRIEF SUMMARY OF THE INVENTION

The present invention falls within the category of devices utilizing IDCI's. In particular, it relates to the sensing means within the personal appliance itself.

Rather than using a sensing means which can possibly be missed—untouched—by water entering the appliance, or, which in manufacturing, may be installed slightly out of the desired position (and so be missed by water), this invention uses electrically-conductive coatings on the inner surfaces of the appliance. These coatings are so positioned that entering water must, of necessity, contact these conductive surfaces before it reaches wiring or switches carrying voltage. The result is that the sensor is already in contact with the water by the time the water reaches any source of voltage and, consequently, actuation of the immersion detector circuit interrupter (IDCI) is more rapid and more certain.

DESCRIPTION OF THE DRAWINGS

FIG. 1 is a top plan view of a personal care appliance, in this instance hair dryer.

FIG. 2 is a cross-section of the dryer, taken on line 2—2 of FIG. 1.

FIG. 3 is a front plan view and partial section, taken on line 3—3 of FIG. 2.

FIG. 4 is a section, taken on line 4—4 of FIG. 2.

FIG. 5 is a phantom perspective of the dryer housing, showing, through shading, the preferred location of the conductive coating on the inner surface of the dryer.

FIG. 6 is a circuit diagram showing a form of sensing detection circuit (IDCI).

DETAILED DESCRIPTION OF THE INVENTION

The invention is disclosed here in connection with a small hair dryer 1. Dryer 1 has the usual molded plastic housing 3 including two complementary and interfitting molded plastic sections, air outlet section 4 and air inlet section 5, with air inlet 7 and air outlet 8. The dryer includes a motor 9 and a fan 11. The air inlet 5 often contains a fine mesh screen 13, across the inlet, to prevent hair from entering the inlet and getting snarled in the fan 11.

Line cord 17 brings power into the unit to on-off-temperature switch 19. When the switch is on, the power passes to the load 12, that is, to motor 9 and electrical heating elements. If desired, the dryer may also include an indicator light 21, showing whether or not the unit is on.

An immersion detection circuit interrupter (IDCI) 37 is at the outer end of the line cord, near the plug; this is not shown in connection with FIG. 2, but is found in the circuit diagram of FIG. 6. A third wire, sensing wire 35, parallels the line cord for passing any sensed voltage to the IDCI (see FIG. 2). Such sensed voltage occurs when water enters the dryer; it also appears when the test button 31 is pressed connecting the phase side of the power cord to the sensor wire.

A conductive coating 25 has been applied to the inner surface of the housing sections 4 and 5 and is connected to sensing wire 35. This coating may be used throughout the entire inner surface. To the extent that there are openings in the housing sections, the conductive coating should surround the openings. Also, there is preferably a gap 15 between the screen 13 and the outlet grill 8 and the beginning of the coating 25. This gap prevents any electrical power which may contact the coating from being passed to the grill, and, so, possibly contacting the user.

One or both of the inner surfaces of the sections 4 and 5 should have a molded guide 28 and adapted to position and hold an interconnecting spring 27 in position pressing against both inner surfaces. Spring 27 interconnects the conductive coatings 25 on the two surfaces.

The conductive coatings 25 may be made of any suitable material which will bond to the molded plastic surfaces and carry electricity. It has been found, however, that nickel in an acrylic base is suitable. The nickel should be in a solvent (such as a mixture of propyl and butyl acetates with ethanol) that secures it well to the housing material. One satisfactory coating is known as Electodag 550, produced by Acheson Colloids Company. It includes about 45% nickel and 37.6% solvent together with filler.

The circuit of the dryer is shown schematically in FIG. 6. The IDCI 37 is on the power line adjacent to the plug. Leads 17 run from the IDCI through the switch 19 and indicator light to the load. The switch may be of any desired type; thus, it can be a simple on-off switch or a switch that can, by varying the resistances in the circuit or by some other means, change the heat level and/or the motor speed. Sensing wire 35 runs between IDCI 37 and the conductive coating 25, and is connected to the coatings on the two housing sections 4 and 5 through contact spring interconnector 27. A test switch 31 may be incorporated in the circuit, if desired; it would simply be a means for connecting sensing wire 35 with the phase side of line cord 17. This would energize wire 35 and so test IDCI 37 to be sure that is was operative.

IDCI 37 may be any of several types now on the market. In essence, it is a unit which breaks the circuit on both of leads 17 in the event voltage is impressed upon sensing wire 35.

In use, the dryer is operated in the normal way. In the event, however, that water enters either the air inlet 7 or the air outlet 8, it will contact the coating 25 first. If it proceeds further, to where it can touch either line cord 17 or any of the associated circuitry, it immediately causes power to flow through the water and then the conductive coating to sensing wire 35. This, then, serves to actuate the IDCI 37 and to break both circuits to line cord 17. Thus, all power to the unit has been cut off. By having a gap 15 between the conductive coating 25 and screen 13, the likelihood of any electricity reaching that grill and causing a shock is reduced.

As mentioned above, the coating 25 may be used throughout the inner surfaces or limited to the area specified. It has been found, however, that the limited coverage is adequate to protect the user. The coating may, however, be extended throughout the surface if desired.

I claim:

1. In a personal appliance adapted for shock hazard protection and having a two-section housing, electrical units mounted within the housing, a power cord leading to said housing, an IDCI on said power cord, and a sensing wire leading from said housing to said IDCI, that improvement including electroconductive coating on substantial portions of the internal surfaces of said housing sections, means for interconnecting said coating on each of said surfaces, and said sensing wire being connected to said coating, whereby water contacting said coating and said power cord or any of said electrical units will cause a voltage in said sensing wire and thereby trigger said IDCI.

2. In a personal appliance as set forth in claim 1 that improvement in which said interconnecting means is a spring interconnector connecting said coatings on said surfaces and means for holding said spring in interconnecting position.

3. In a personal appliance as set forth in claim 1 that improvement including at least one opening in one of said housing sections and a protective screen covering said opening, said coating being spaced from said screen, and said screen being free from electrical connections.

4. A personal appliance, such as a hair dryer, having enhanced shock hazard protection, said appliance including a housing, said housing being formed of two complementary and interfitting sections, electrical units mounted within said housing, a power cord leading to said housing, an IDCI on said power cord, and a sensing wire associated with said power cord leading from said housing to said IDCI, electroconductive coating on substantial portions of the internal surfaces of said housing sections, and means for interconnecting said coating to said sensor wire, and said opening including a protective screen, said coating being spaced from said screen, and said screen not being electrically connected, whereby water contacting said coating and said power cord or any of said electrical units will cause a voltage in said sensing wire and thereby trigger said IDCI.

5. A personal appliance, such as a hair dryer, having enhanced shock hazard protection, said appliance including a housing, said housing being formed of two complementary and interfitting sections, electrical units mounted within said housing, a power cord leading to said housing, an IDCI on said power cord, and a sensing wire associated with said power cord leading from said housing to said IDCI, electroconductive coating on substantial portions of the internal surfaces of said housing sections, and means for interconnecting said coating to said sensor wire, and an interconnecting spring positioned within said appliance and interconnecting said coating on one of said housing sections with said coating on the other of said housing sections, and means for holding said spring in position, whereby water contacting said coating and said power cord or any of said electrical units will cause a voltage in said sensing wire and thereby trigger said IDCI.

* * * * *